United States Patent [19]

Glog et al.

[11] Patent Number: 5,529,325
[45] Date of Patent: Jun. 25, 1996

[54] BICYCLE SEAT

[76] Inventors: Dorothy Glog, 50 Teewaddle Hill Rd., Amherst, Mass. 01002; Philip W. Coderre, R.R. 1 Box 150F, Conway, Mass. 01341

[21] Appl. No.: 453,671

[22] Filed: May 30, 1995

Related U.S. Application Data

[63] Continuation of Ser. No. 288,648, Aug. 10, 1994, abandoned, which is a continuation of Ser. No. 9,139, Jan. 26, 1993, abandoned.

[51] Int. Cl.$^6$ ........................................ B62J 1/16
[52] U.S. Cl. .................... 280/202; 224/415; 224/421; 224/427; 224/424; 224/430
[58] Field of Search ...................... 280/202, 275, 280/283, 288, 288.4, 290, 304.5, 32.7; 267/175, 255; 224/32 A, 32 R, 33 R, 37, 38, 30 R

[56] References Cited

U.S. PATENT DOCUMENTS

| | | | |
|---|---|---|---|
| 645,668 | 3/1900 | LeMoon | 280/202 |
| 902,920 | 11/1908 | Silva | 280/283 |
| 924,541 | 6/1909 | Duck | 280/202 |
| 1,000,771 | 8/1911 | Bracher | 280/202 |
| 1,088,793 | 3/1914 | Peterson | 280/202 |
| 1,090,268 | 3/1914 | Bradley | 280/202 |
| 1,717,056 | 6/1929 | Mesinger | 280/202 |
| 2,158,618 | 5/1939 | Dobrowolski | 280/202 |
| 2,760,772 | 8/1956 | McIntyre | 267/255 |
| 3,802,598 | 4/1974 | Burger et al. | 280/202 |

*Primary Examiner*—Anne Marie Boehler

[57] ABSTRACT

An auxiliary seat adapted to be mounted over the wheel of a conventional bicycle includes a shock absorbing support assembly. The support assembly includes a pair of struts, one end of each being fixedly secured to the bicycle frame near the bicycle wheel axle and the other end of each being secured to the primary seat mounting bolt of the bicycle. Each strut, in turn, includes a shock absorber assembly for cushioning the axillary seat when the bicycle traverses a bump or other obstruction. The preferred shock absorber assembly comprises a helical compression spring retained between a sleeve coaxially and slidably engaging the bottom portion of each strut. The normal or rest position of the spring may be selectively adjustably positioned at various axial locations on the lower portion of the strut by employment of a spring retainer engaging one of a series of axially spaced holes in the strut to thereby vary the bias of the compression spring and therefore compensate the shock absorbing capacity of the shock absorber assembly in accordance with the weight of the expected occupant of the auxiliary seat.

7 Claims, 3 Drawing Sheets

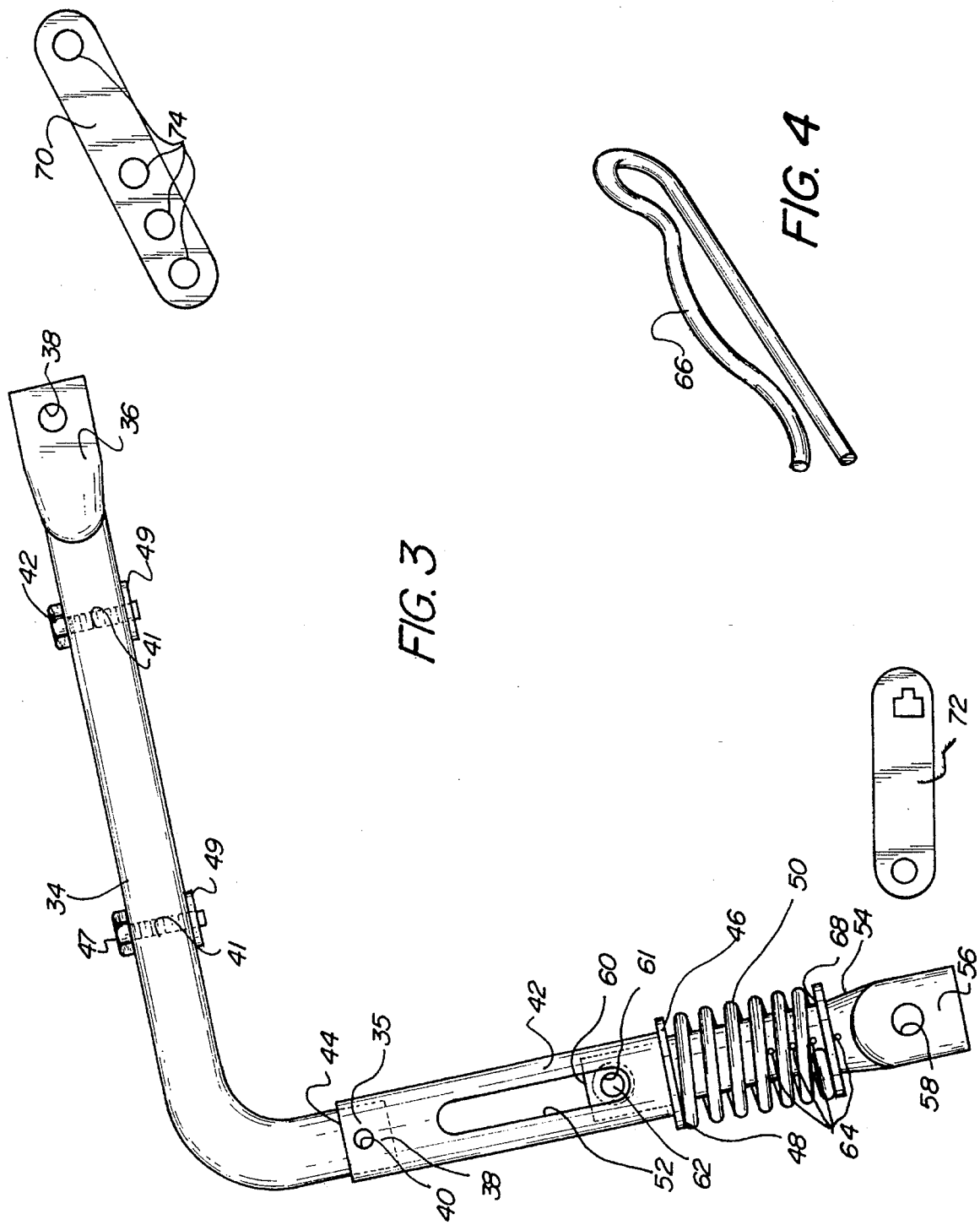

BICYCLE SEAT

This application is a continuation of application Ser. No. 08/288,648, filed Aug. 10, 1994, now abandoned which is a continuation of application Ser. No. 08/009,139 filed Jan. 26, 1993, now abandoned.

BACKGROUND OF THE INVENTION

1. Field of the Invention

The present invention relates generally to bicycle seats, and more particularly, to an auxiliary bicycle seat adapted to provide shock absorbing support for an occupant of the auxiliary seat when the latter is mounted on a conventional bicycle or the like.

2. Description of the Prior Art

Shock absorbing seat supports for bicycles are generally well known. U.S. Pat. Nos. 4,736,983; 4,997,232; and 5,020,851 show a variety of prior art arrangements where a shock absorber assembly is combined in one way or another with the mounting post of the primary seat of a bicycle. Similarly, U.S. Pat. No. 5,029,888 discloses a cantilevered bicycle seat have a shock absorbing pad associated therewith. None of these arrangements however, contemplates a shock absorbing support assembly for an auxiliary seat such as may be used to carry a small child, or even an infant, on a conventional bicycle. While U.S. Pat. No. 4,969,658 teaches an auxiliary seat supported on the frame of a bicycle, this patent fails to show or suggest any shock absorbing means therewith.

A clear need thus exists for an auxiliary bicycle seat having a shock absorbing support assembly so that small occupants such as young children or infants may comfortably and safely be transported on a conventional bicycle. The foregoing objective is met by the unique bicycle seat and support assembly for same of the present invention as will be made apparent from the following description thereof. Other advantages of the present invention over the prior art also will be rendered evident.

SUMMARY OF THE INVENTION

To achieve the foregoing and other advantages, the present invention, briefly described, provides an auxiliary seat adapted to be mounted over the wheel of a conventional bicycle and including a shock absorbing support assembly. The support assembly includes a pair of struts, one end of each being fixedly secured to the bicycle frame near the bicycle wheel axle and the other end of each being secured to the primary seat mounting bolt of the bicycle. Each strut, in turn, includes shock absorber means for cushioning the auxiliary seat when the bicycle traverses a bump or other obstruction. The preferred shock absorber comprises a helical compression spring retained between a sleeve coaxially and slidably engaging the bottom portion of each strut. The normal or rest position of the spring may be selectively adjustably positioned at various axial locations on the lower portion of the strut by means of a spring retainer engaging one of a series of axially spaced holes in the strut to thereby vary the bias or spring constant of the compression spring and therefore compensate the shock absorbing capacity of the assembly in accordance with the weight of the expected occupant of the auxiliary seat.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least one preferred embodiment of the invention in detail, it is to be understood that the invention is not to be limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bicycle seat and support assembly for same which has all of the advantages of the prior art and none of the disadvantages.

It is another object of the present invention to provide a new and improved bicycle seat and support assembly for same which may be easily and efficiently manufactured and marketed.

It is a further objective of the present invention to provide a new and improved bicycle seat and support assembly for same of relatively inexpensive and reliable construction.

An even further object of the present invention is to provide a new and improved bicycle seat and support assembly for same which is susceptible of a low cost of manufacture with regard to both materials and labor, and which accordingly is then susceptible of low prices of sale to the consuming public, thereby making such bicycle seat and support assembly for same available to the buying public.

Still yet a further object of the present invention is to provide a new and improved auxiliary bicycle seat and support assembly for same having shock absorbing means associated therewith.

It is still a further object of the present invention is to provide a new and improved bicycle auxiliary seat having shock absorbing means associated therewith and wherein the assembly is adjustable to compensate for the weight of the occupant of the auxiliary seat.

Still a further object of the present invention is to provide a new and improved bicycle seat having shock absorbing means associated therewith and further including safety guard means for preventing the occupants' feet or other bodyparts from engaging the spokes of the bicycle particularly when the bicycle is in motion.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 3 is an elevational view of a portion of the embodiment of FIGS. 1 and 2 partially assembled.

FIG. 4 is a perspective view of the removable spring retainer employed with the present invention.

DESCRIPTION OF THE PREFERRED EMBODIMENT

With reference now to the drawings, a new and improved bicycle seat and support assembly for same embodying the principles and concepts of the present invention will be described.

Figure 1:
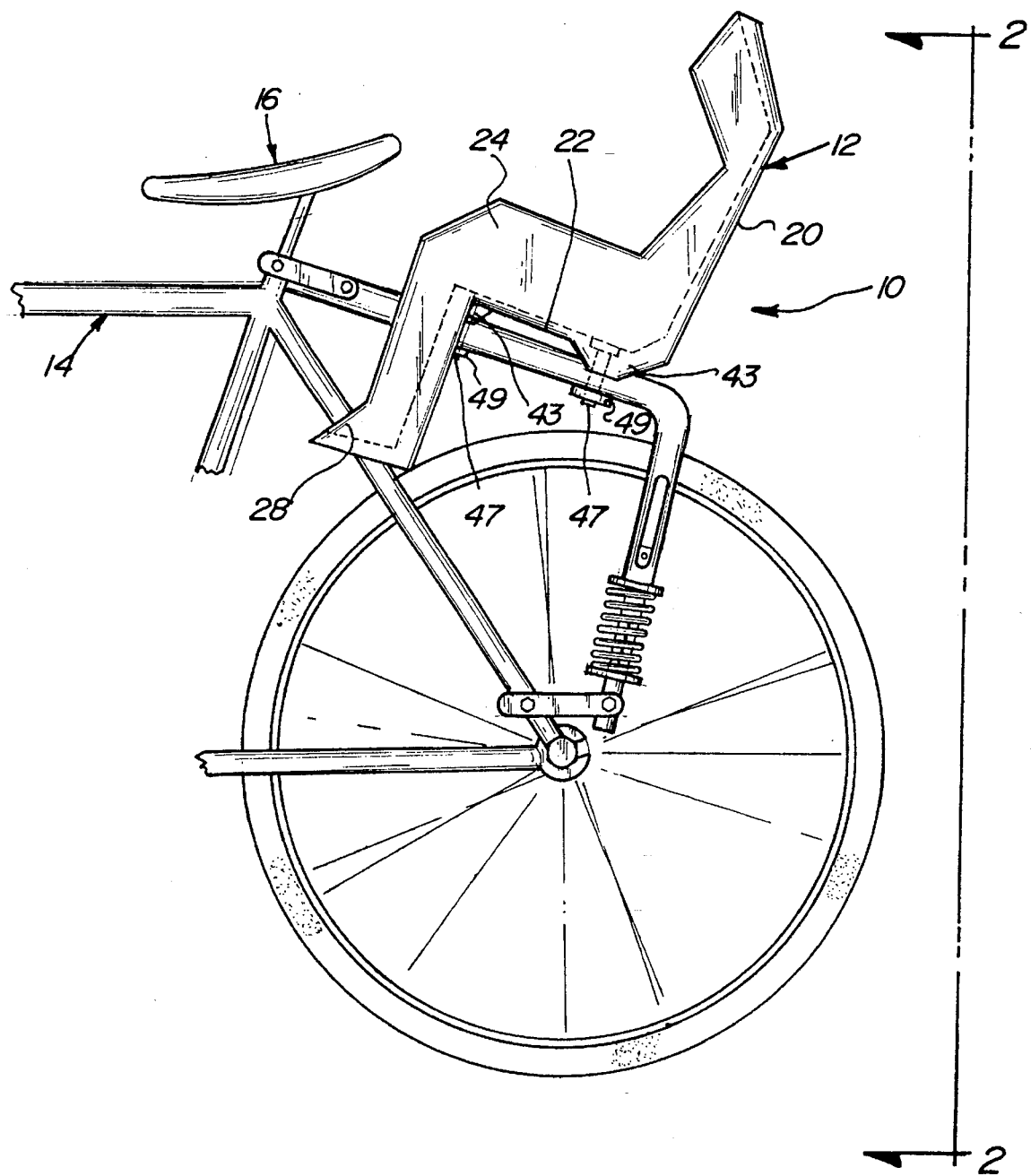
FIG. 1 is an elevational view showing the preferred embodiment of the bicycle seat of the invention operatively attached to a conventional bicycle.
Figure 2:
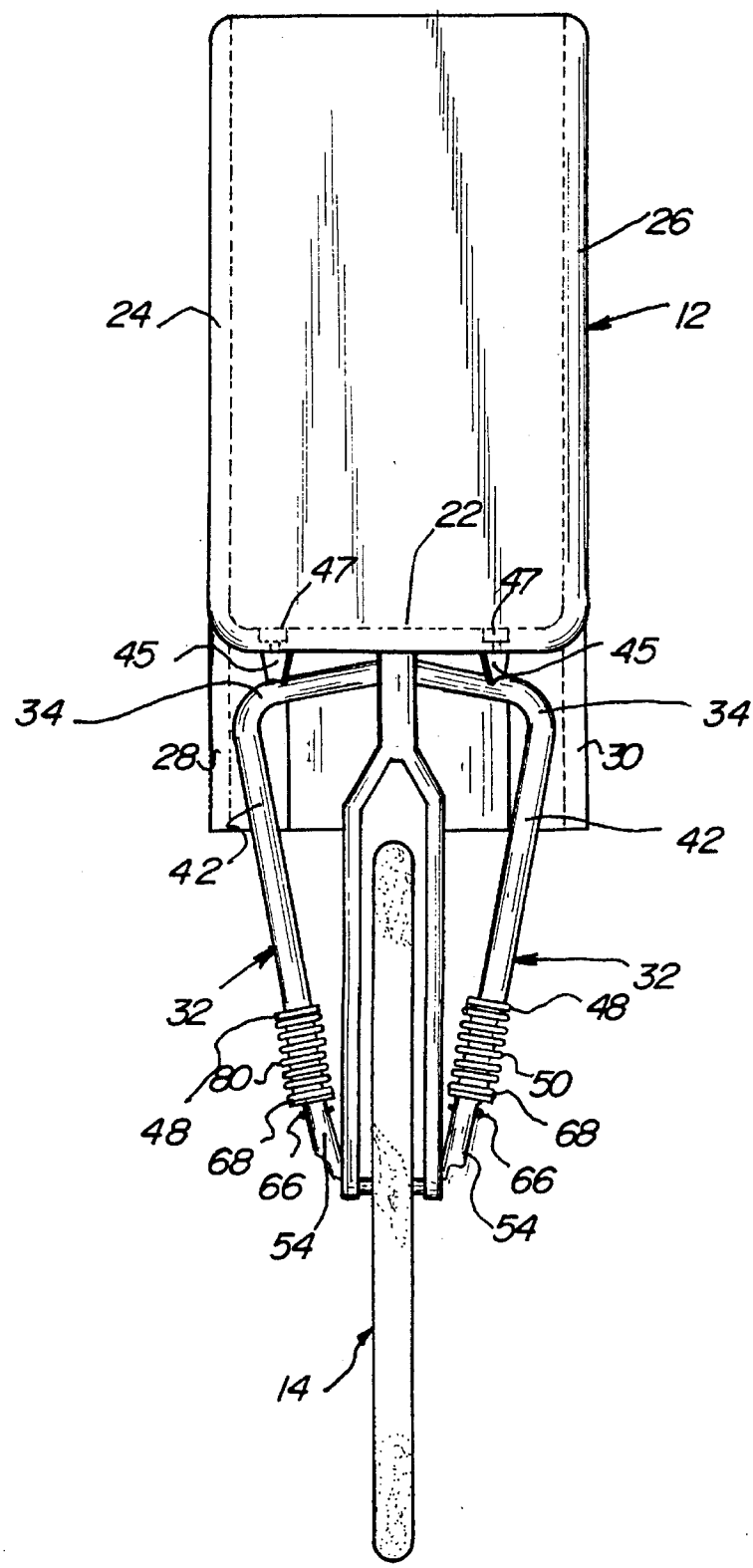
FIG. 2 is an elevational view of one of the preferred embodiment of Figure taken along line 2—2 of Figure

Turning initially to FIGS. 1 and 2, there is shown the preferred exemplary embodiment of the bicycle seat assembly according to the invention generally designated by reference numeral 10. As shown In FIGS. 1 and 2, bicycle seat assembly 10 comprises an auxiliary seat 12 supportedly mounted on a conventional bicycle 14 having a primary seat 16. More specifically, the auxiliary seat 12 is supported over the rear wheel of conventional bicycle 14 behind primary seat 16 and is adapted to safely and comfortably support a young child or infant in a position facing forward or toward the front of the bicycle.

In this regard, auxiliary seat 12 preferably is fabricated of a strong durable molded plastic material such as polyurethane, for example, and is shaped somewhat in the form of a bucket substantially as shown. Thus, auxiliary seat 12 includes a back rest portion 20, a seat portion 22, sidewall portions 24, 26, and a pair of downwardly depending foot rest portions 28, 30 that are laterally spaced apart to straddle the rear wheel of the bicycle 14 (FIG. 2). A cushion or pad liner (not shown) may be placed on the inside surface of the seat 12 to enhance the comfort of the occupant. In addition, a conventional seat belt (not shown) to help to safely retain the occupant may be provided. Such optional seat appliances are commercially available and per se form no part of the present invention. Suffice it to say, in the preferred embodiment illustrated, the molded bucket seat 12 is supported over the rear wheel of a bicycle in a forward facing manner by a unique support assembly according to the present invention as will now be explained in greater detail below.

In practicing the invention, and as best seen in FIG. 2, it will be understood that a pair of identical support assemblies each generally designated by reference numeral 32 located on opposite sides of the rear wheel respectively of the bicycle 14 is employed to support the auxiliary seat 12 in the configuration of FIGS. 1 and 2; hence, a description of only one such assembly will be given.

Turning to FIG. 3, each support assembly 32 comprises a first tubular strut member 34 having a flattened end 36 through which a mounting hole 38 extends. The other or opposed end portion 35 of the strut member 34 is bent at an angle and has proximally located to the cylindrical end edge 38 thereof a through-hole 40 for receiving a fastener bolt not shown for the sake of clarity. Hole 40 also extends through the opposed walls of hollow cylindrical sleeve member 42 proximal to its upper end 44. Hence, in the preferred arrangement shown, the end of strut member 34 is coaxially received within the upper end of sleeve member 42 and the two parts fastened together via a conventional bolt and nut fastener assembly with the bolt extending through common hole 40 first strut member and the sleeve member.

The first strut member serves to support seat 12 directly via the provision of a pair of longitudinally spaced holes 41 extending orthogonally through the strut member intermedially thereof. Seat 12 includes a corresponding pair of longitudinally spaced bearing elements each designated by reference numeral 43 and each having a suitable through hole 45 aligned with holes 41, respectively, with each pair of aligned holes 41,43 being adapted to receive a mounting bolt fastener 47 and cooperating nut 49 substantially as depicted.

The lower or opposed end 46 of sleeve member 42 terminates in an integral circular flange 48 which serves as a bearing surface for a helical compression spring 50 as will be further explained below. Hollow cylindrical sleeve member 42 also includes intermedially of its opposed ends, a longitudinally extending slot 52 extending through the opposed walls of the sleeve member. A second strut member 54 has a bottom flattened end 56 through which extends a mounting hole 58. The upper or opposed end 60 of second strut member 54 is coaxially received within the opening in end 46 of sleeve member and has a hole 61 extending therethrough in alignment with longitudinal slot 52. A travel limiting bolt 62 is adapted to be inserted through hole 61 and suitably fastened in place by a nut (not shown) and is large enough to engage the opposed extremities of longitudinal slot 52 as the upper end portion of second strut member 54 slides up and/or down in the bore of the sleeve member 42. Hence, it will be appreciated that the provision of slot 52 and bolt 62 arranged as shown effectively limits the coaxial sliding movement of the second strut relative to the sleeve member.

Second strut member 54 further includes a series of longitudinally spaced and aligned holes each being designated by reference numeral 64 for receiving a spring retainer 66 (FIG. 4). The holes preferably extend through the opposed walls of the strut member and together with retainer 66 serve to axially position and support a washer 68 in different axial locations on the second strut member defined by each of the holes 64. The washer, in turn, provides a second bearing surface for helical spring 50 which latter is positioned about the exterior of the second strut with the spring's opposite ends engaging circular flange 48 and washer 68, respectively. By this arrangement, any slidable displacement of the first strut member 34 and the sleeve member 42 attached to end portion 35 thereof will be resiliently resisted by the compression of helical spring 50 engaging circular flange 48 (affixed to sleeve 42) and washer 68 (affixed to second strut member 54).

In the normal position defined when washer 68 is retained proximal to the lowermost hole 64 by spring retainer 66 as shown in FIG. 3, helical compression spring 50 preferably is in a non-compressed condition and provides sufficient "shock absorbing" action with respect to axial loading of the sleeve member on the second strut member as would be the case when a relatively small child or infant occupies seat 12 to which the support assembly 32 is attached. In this regard, however, and in accordance with the present invention, the support assembly may be adjusted to accommodate a seat occupant of heavier weight. This is accomplished, for example, in accordance with the principles of the invention, by removing spring clip retainer 66 from the first or lower row of holes 64, axially repositioning washer 68 axially upwardly on the second strut member as viewed in FIG. 3 thereby compressing spring 50, and then replacing the spring clip retainer in the new or other hole 64 corresponding to the new adjusted axial position of the washer. In this newly adjusted state, the spring 50 will normally be under slight compression and therefore will afford greater resistance to axially directed forces transmitted through the sleeve member and its circular flange as would be the case if a heavier occupant were to be seated in seat 12. Further adjustment may be effected in a similar manner using whatever hole 64 deemed desirable for a given occupant's weight, it being understood that the deflection of spring 50 should be limited to a greater extent for heavier occupants by affixing the retainer spring clip 66 in a higher hole 64 as viewed in FIG. 3 and vice versa. It is thus seen that the degree of cushioning action afforded by the shock absorber assembly of the invention may be adjusted to accommodate a range of occupants adapted to be supported in seat 12 and having different size and weight by merely compressing or relaxing spring 50 and placing the spring retainer clip 66 in the desired axially located hole.

The auxiliary bicycle seat and its support assembly 10 may be attached easily to a conventional bicycle with the aid of mounting brackets 70 and 72. Mounting bracket 70 facilitates attachment of end 36 of first strut member to the mounting bolt of the bicycle's primary seat, whereas mounting bracket 72 facilitates attachment of the bottom end of the second strut member to the rear wheel support strut of the bicycle using suitable known nut and bolt fasteners or the like being employed to fasten these parts together as is believed readily apparent. Mounting bracket 70 preferably is provided with a series of longitudinally spaced holes 74 to afford a relatively wide degree of adjustment when attaching the bicycle seat and its support assembly so that the seating surface of seat 12 is positioned comfortably for a given occupant. Generally speaking, it is preferred to mount the seat with the seating surface thereof being raked upwardly at a slight angle to the ground as this will urge the occupant against the seat's backrest, such a preferred position being shown for example, in FIG. 1.

In operation, the effect of any bumps engaged by the bicycle will be absorbed by the floating or "shock absorbing" action of the first strut member 34 and its attached sleeve member 42 against the helical spring 50, washer 68, and the second strut member 54. Hence, the bicycle seat and support assembly of the invention enables occupants such as small children or even infants to be carried in a safe and comfortable manner.

Although the present invention has been particularly described in connection with a preferred embodiment comprising an auxiliary seat mounted on a conventional bicycle, it will be understood that the invention is broad enough to cover the use of other forms of conveyances where an auxiliary seat is positioned over or proximal to a rotating wheel. It is apparent from the above that the present invention accomplishes all of the objectives set forth by providing a new and improved bicycle seat and support assembly for same that is low in cost, relatively simple in design and operation, and which may advantageously be used to provide adjustable shock absorbing support for an occupant seated in an auxiliary seat mounted on a movable conveyance.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by LETTERS PATENT of the United States is as follows:

1. An auxiliary seat assembly comprising:

an auxiliary seat;

a first left strut member having first and second ends with the first end thereof being pivotally mountable to a bicycle, the auxiliary seat being coupled to the first left strut member;

a hollow cylindrical left sleeve member extending at an angle from the second end of the first left strut member, the left sleeve member being shaped so as to define a pair of longitudinal slots directed through diametrically opposed walls thereof;

a first left flange projecting radially outwardly from a lower end of the left sleeve member;

a second left strut member pivotally mountable to a bicycle and being coaxially received within a lower end of the left sleeve member;

a second left flange projecting radially outwardly from the second left strut member and being spaced from the first left flange;

a left helical compression spring concentrically positioned about the second left strut member and between the first and second left flanges;

a left travel limiting bolt directed through the second left strut member and projecting laterally of the left sleeve member through both of the longitudinal slots thereof;

a first right strut member having first and second ends with the first end thereof being pivotally mountable to a bicycle, the auxiliary seat being coupled to the first right strut member;

a hollow cylindrical right sleeve member extending at an angle from the second end of the first right strut member, the right sleeve member being shaped so as to define a pair of longitudinal slots directed through diametrically opposed walls thereof;

a first right flange projecting radially outwardly from a lower end of the right sleeve member;

a second right strut member pivotally mountable to a bicycle and being coaxially received within a lower end of the right sleeve member;

a second right flange projecting radially outwardly from the second right strut member and being spaced from the first right flange;

a right helical compression spring concentrically positioned about the second right strut member and between the first and second right flanges;

a right travel limiting bolt directed through the second right strut member and projecting laterally of the right sleeve member through both of the longitudinal slots thereof; and wherein the second left and right flanges are movably mounted about the respective second left and right strut members, and further wherein the second left and right strut members are each shaped so as to define a series of longitudinally spaced and aligned adjustment holes extending therethrough; and further comprising a left spring retainer directed through one of the adjustment holes of the second left strut member, and a right spring retainer directed through one of the adjustment holes of the second right strut member.

2. The auxiliary seat assembly of claim 1, wherein the second left and right strut members are each shaped so as to define a bottom flattened end having a mounting hole directed through the bottom flattened end thereof.

3. The auxiliary seat assembly of claim 2, wherein the first ends of the first left and right tubular strut members are each shaped so as to define a flattened end having a mounting hole directed through the bottom flattened end of the first left and right tubular strut members.

4. The auxiliary seat assembly of claim 3, and further comprising left and right upper mounting brackets pivotally coupled to first ends of the respective first left and right strut members, the upper mounting brackets each including a series of longitudinally spaced mounting bracket holes directed therethrough.

5. The auxiliary seat assembly of claim 4, wherein the second ends of the first left and right strut members are each bent at an angle relative to a longitudinal axis directed therethrough, with the second ends of the first left and right tubular strut members each being coaxially received within an upper end of the respective left and right sleeve members.

6. The auxiliary seat assembly of claim 5, wherein the auxiliary seat includes a back rest portion, a seat portion coupled to the back rest portion, and sidewall portions projecting from the seat portion along laterally opposed sides thereof.

7. The auxiliary seat assembly of claim 6, wherein the auxiliary seat further includes a pair of downwardly depending foot rest portions extending from the seat portion and being laterally spaced apart so as to straddle a rear wheel of a bicycle when coupled thereto.

* * * * *